United States Patent
Krishnan et al.

(10) Patent No.: US 12,358,469 B2
(45) Date of Patent: Jul. 15, 2025

(54) SENSOR ASSEMBLY WITH CLEANING

(71) Applicant: Ford Global Technologies, LLC, Dearborn, MI (US)

(72) Inventors: Venkatesh Krishnan, Canton, MI (US); Segundo Baldovino, Novi, MI (US); Michael Robertson, Jr., Garden City, MI (US); Fabio Ferreira, Hortolandia (BR); Henrico Quinelato, Pituaçu (BR)

(73) Assignee: Ford Global Technologies, LLC, Dearborn, MI (US)

( * ) Notice: Subject to any disclaimer, the term of this patent is extended or adjusted under 35 U.S.C. 154(b) by 520 days.

(21) Appl. No.: 17/589,915

(22) Filed: Feb. 1, 2022

(65) Prior Publication Data

US 2023/0242080 A1    Aug. 3, 2023

(51) Int. Cl.
*B60W 60/00* (2020.01)
*B60S 1/04* (2006.01)
*B60S 1/52* (2006.01)

(52) U.S. Cl.
CPC . *B60S 1/52* (2013.01); *B60S 1/04* (2013.01); *B60W 60/0051* (2020.02); *B60W 2540/215* (2020.02)

(58) Field of Classification Search
CPC ...... B60S 1/04; B60S 1/08; B60S 1/46; B60S 1/481; B60S 1/482; B60S 1/485; B60S 1/52; B60S 1/54; B60S 1/56; B60S 1/60; B60S 1/606; B60W 2540/215; B60W 60/005; B60W 60/0051; G01S 13/931; G01S 17/931; G01S 2007/4977; G01S 7/4043
See application file for complete search history.

(56) References Cited

U.S. PATENT DOCUMENTS

| | | | |
|---|---|---|---|
| 6,082,636 A | 7/2000 | Yoshida et al. | |
| 2013/0175962 A1* | 7/2013 | Sabi | B60S 1/08 318/468 |
| 2015/0030462 A1 | 1/2015 | Boekenkamp | |
| 2018/0170316 A1* | 6/2018 | Park | B60S 1/0833 |
| 2018/0354469 A1* | 12/2018 | Krishnan | G01S 17/931 |
| 2019/0100168 A1* | 4/2019 | Krishnan | B60S 1/0818 |
| 2021/0107040 A1* | 4/2021 | Violetta | B08B 3/041 |
| 2021/0370885 A1* | 12/2021 | Dingli | B08B 5/02 |

FOREIGN PATENT DOCUMENTS

| | | |
|---|---|---|
| DE | 102019000527 A1 | 3/2020 |
| JP | 2008137548 A | 6/2006 |

\* cited by examiner

*Primary Examiner* — Charles J Han
(74) *Attorney, Agent, or Firm* — Frank A. MacKenzie; Brooks Kushman P.C.

(57) ABSTRACT

Upon determining an autonomous mode for a vehicle is activated, a motor is actuated to move a wiper across a windshield in a low mode based on determining to clean the windshield. A blower is actuated to direct air across a sensor. Then, after expiration of a first timer, a pump is actuated according to a pressure threshold to direct fluid through a fluid nozzle and across the windshield towards the sensor. The pressure threshold specifies a fluid pressure less than a maximum fluid pressure for the pump. The pump is stopped after expiration of a second timer.

19 Claims, 8 Drawing Sheets

SENSOR ASSEMBLY WITH CLEANING

BACKGROUND

Autonomous vehicles typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. When sensor lenses, covers, and the like become dirty, smudged, etc., sensor operation can be impaired or precluded.

DETAILED DESCRIPTION

Figure 1:
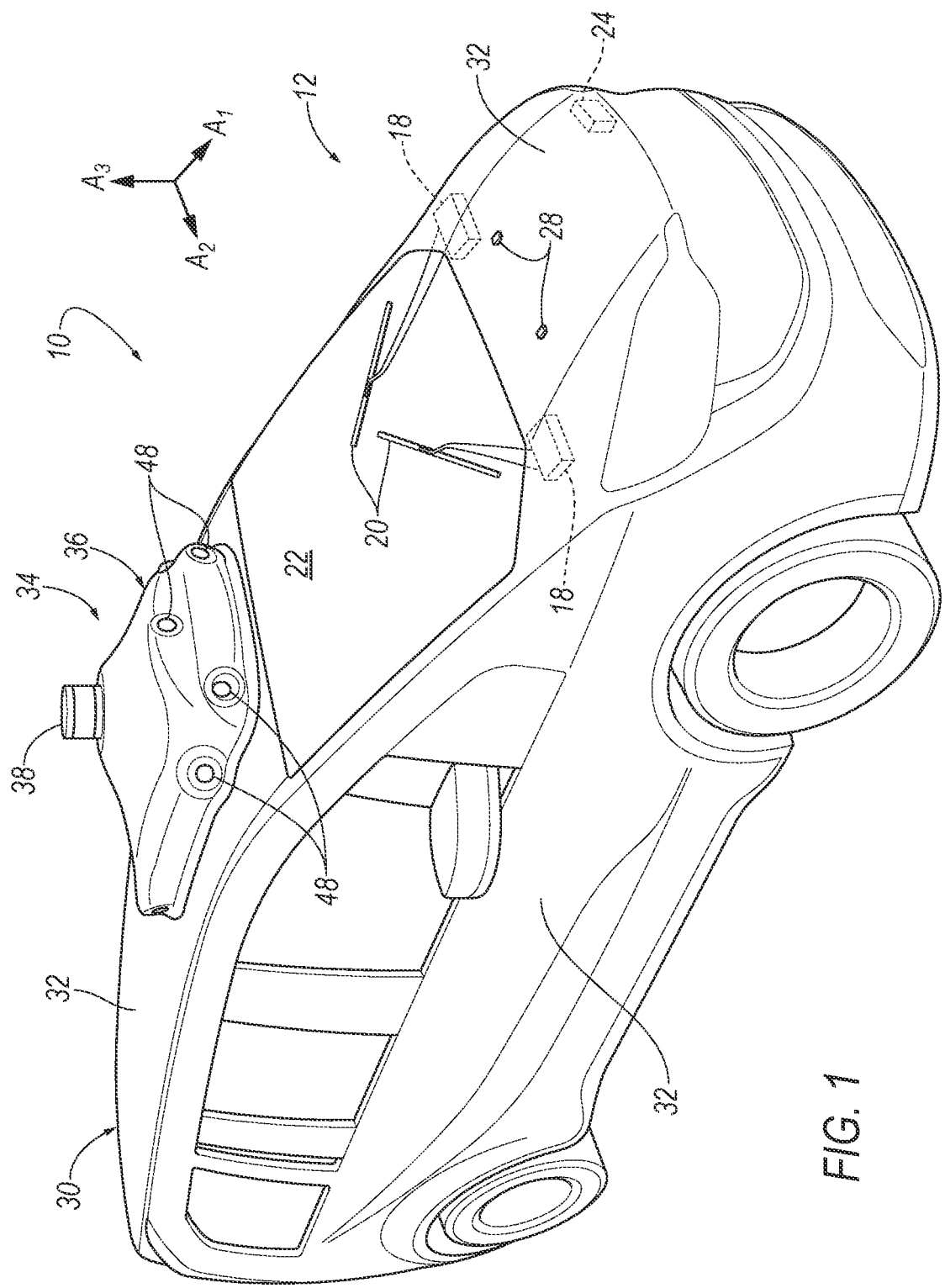
FIG. 1 is a perspective view of a vehicle including an example sensor system.

A vehicle system includes a sensor. A blower is configured to direct air across the sensor. A motor is configured to move a wiper across a windshield. A pump is configured to direct fluid across the windshield and towards the sensor. A computer is computer communicatively coupled to the sensor, the blower, the motor, and the pump. The computer is programmed to, upon determining to clean the windshield, actuate the motor in a low setting based on determining an autonomous mode for the vehicle is activated. The computer is further programmed to actuate the blower. The computer is further programmed to then, after expiration of a first timer, actuate the pump according to a pressure threshold that specifies a fluid pressure less than a maximum fluid pressure for the pump. The computer is further programmed to stop the pump after expiration of a second timer.

The computer can be further programmed to determine to clean the windshield based on a user input.

The computer can be further programmed to stop the blower after stopping the pump. The computer can be further programmed to stop the blower after stopping the motor.

The vehicle system can include a fluid nozzle in fluid communication with the pump and aimed to discharge fluid across the windshield. The computer can be communicatively coupled to the fluid nozzle and can be further programmed to, upon determining the autonomous mode is activated, actuate the fluid nozzle to discharge fluid in a jet pattern. The computer can be further programmed to, upon determining the autonomous mode is deactivated, actuate the fluid nozzle to discharge fluid in a flat-fan pattern. The computer can be further programmed to determine to transition the autonomous mode between a deactivated state and an activated state based on a user input.

The computer can be further programmed to initiate the first timer upon actuating the blower.

The computer can be further programmed to initiate the second timer upon actuating the pump.

The system can include an air nozzle aimed to discharge air across the sensor and a duct coupled to the blower and the air nozzle.

The system can include a body supporting the windshield and a housing mounted to the body and spaced from the windshield. The sensor and the blower can be disposed in the housing, and the pump and the motor can be disposed outside the housing.

A computer includes a processor and a memory, the memory storing instructions executable by the processor to, upon determining to clean a windshield for a vehicle, actuate a motor to move a wiper across the windshield in a low setting based on determining an autonomous mode for the vehicle is activated. The instructions further include instructions to then, after expiration of a first timer, actuate a pump according to a pressure threshold to direct fluid through a fluid nozzle and across the windshield towards the sensor. The pressure threshold specifies a fluid pressure less than a maximum fluid pressure for the pump. The instructions further include instructions to stop the pump after expiration of a second timer.

The instructions can further include instructions to determine clean the windshield based on a user input.

The instructions can further include instructions to stop the blower after stopping the pump. The instructions can further include instructions to stop the blower after stopping the motor.

The instructions can further include instructions to, upon determining the autonomous mode is activated, actuate the fluid nozzle to discharge fluid in a jet pattern.

The instructions can further include instructions to, upon determining the autonomous mode is deactivated, actuate the fluid nozzle to discharge fluid in a flat-fan pattern.

The instructions can further include instructions to determine to transition the autonomous mode between a deactivated state and an activated state based on a user input.

The instructions can further include instructions to initiate the first timer upon actuating the blower and the second timer upon actuating the pump.

A method includes, upon determining to clean a windshield for a vehicle, actuating a motor to move a wiper across the windshield in a low setting based on determining an autonomous mode for the vehicle is activated. The method further includes actuating a blower to direct air across a sensor. The method further includes then, after expiration of a first timer, actuating a pump according to a pressure threshold to direct fluid through a fluid nozzle and across the windshield towards the sensor. The pressure threshold specifies a fluid pressure less than a maximum fluid pressure for the pump. The method further includes stopping the pump after expiration of a second timer.

Further disclosed herein is a computing device programmed to execute any of the above method steps. Yet further disclosed herein is a computer program product, including a computer readable medium storing instructions executable by a computer processor, to execute an of the above method steps.

With reference to the Figures, wherein like numerals indicate like parts throughout the several views, a system 12 for a vehicle 10 includes a sensor 14. A blower 16 is configured to direct air across the sensor 14. A motor 18 is configured to move a wiper 20 across a windshield 22. A pump 24 is configured to direct fluid across the windshield 22 and towards the sensor 14. A computer 26 is communicatively coupled to the sensor 14, the blower 16, the motor 18, and the pump 24. The computer 26 is programmed to, upon determining to clean the windshield 22, actuate the motor 18 in a low setting based on determining an autonomous mode for the vehicle 10 is activated. The computer 26 is further programmed to actuate the blower 16. The computer 26 is further programmed to then, after expiration of a first timer, actuate the pump 24 according to a pressure threshold that specifies a fluid pressure less than a maximum fluid pressure for the pump 24. The computer 26 is further programmed to stop the pump 24 after expiration of a second timer.

The computer 26 may receive a user input specifying to clean the windshield 22, as discussed below. In response to the user input, the computer 26 actuates the pump 24 to direct fluid through a windshield fluid nozzle 28 (as discussed below) and across the windshield 22, e.g., typically from a hood towards a roof of the vehicle 10. However, the pump 24 may be actuated according to a maximum pressure to clean the windshield 22, which can cause fluid discharged from the windshield fluid nozzle 28 to contact and possible to then adhere to the sensor 14. Advantageously, while the vehicle 10 is in the autonomous mode, the computer 26 can actuate the blower 16 and the motor 18 in response to the user input. The computer 26 can then actuate the pump 24 according to the pressure threshold. Actuating the pump 24 according to the pressure threshold after actuating the blower 16 and the motor 18 reduces a likelihood of fluid discharged from the windshield fluid nozzle 28 adhering to the sensor 14, which can improve the quality of data gathered by the sensor 14.

With reference to FIG. 1, the vehicle 10 may be any passenger or commercial automobile such as a car, a truck, a sport utility vehicle, a crossover, a van, a minivan, a taxi, a bus, etc.

The vehicle 10 defines a longitudinal axis $A_1$, e.g., extending between a front and a rear of the vehicle 10. The vehicle 10 defines a lateral axis $A_2$, e.g., extending between a left side and a right side of the vehicle 10. The vehicle 10 defines a vertical axis $A_3$, e.g., extending between a top and a bottom of the vehicle 10. The longitudinal axis $A_1$, the lateral axis $A_2$, and the vertical axis $A_3$ are perpendicular to each other.

The vehicle 10 may be an autonomous or semi-autonomous vehicle. A vehicle computer can be programmed to operate the vehicle 10 independently of the intervention of a human driver, completely or to a lesser degree. The vehicle computer may be programmed to operate a propulsion, brake system, steering, and/or other vehicle systems based at least in part on data received from one or more sensors 14, as well as a scanning sensor 38 described below. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

The vehicle 10 includes a body 30. The vehicle 10 may be of a unibody construction, in which a frame and the body 30 of the vehicle 10 are a single component. The vehicle 10 may, alternatively, be of a body-on-frame construction, in which the frame supports the body 30 that is a separate component from the frame. The frame and body 30 may be formed of any suitable material, for example, steel, aluminum, etc.

The body 30 includes body panels 32 partially defining an exterior of the vehicle 10. The body panels 32 may present a class-A surface, e.g., a finished surface exposed to view by a customer and free of unaesthetic blemishes and defects. The body panels 32 include, e.g., a roof, a hood, etc.

Occasionally, but not necessarily, the vehicle 10 may include a shield (not shown) supported by the body 30. The shield may be disposed between the sensors 14 and the windshield fluid nozzles 28. For example, the shield may be attached to the roof, and extend across the windshield 22. The shield may extend forward of the roof relative to the axis $A_1$. Positioning the shield between the sensors 14 and the windshield fluid nozzles 28 allows the fluid discharged from the windshield fluid nozzles 28 to contact the shield prior to the sensors 14, which can reduce a likelihood of the fluid contacting and adhering to the sensors 14. If present, the shield typically does not affect an operation for cleaning the windshield 22 (discussed below regarding FIG. 7). Instead, the shield merely assists in reducing a likelihood of fluid discharged from the windshield fluid nozzles 28 according to the windshield 22 cleaning operation from contacting and adhering to the sensors 14.

With continued reference to FIG. 1, the vehicle 10 includes the wiper 20. The wiper 20 can be any suitable type and/or arrangement for clearing moisture from an exterior of the windshield 22 of the vehicle 10, e.g., conventional, flat, hybrid, or winter blade; standard or beam arm; tandem system, opposed system, single arm, or controlled single arm; etc. The vehicle 10 can include any suitable number of wipers 20, e.g., two or more.

The vehicle 10 includes the motor 18. The motor 18 may be a servo motor or the like. The motor 18 is operatively connected to the wiper 20. That is, motor 18 is configured to operate the wiper 20, i.e., move the wiper 20 pivotally relative to the windshield 22 to wipe, i.e., clear, the windshield 22. The vehicle 10 can include any suitable number of motors 18. For example, the vehicle 10 can include a same number of motors 18 as a number of wipers 20. In such an example, each wiper 20 is connected to one respective motor 18, as shown in FIG. 1. As another example, the vehicle 10 can include a fewer number of motors 18 than a number of wipers 20. In such an example, two or more wipers 20 may be connected to one motor 18.

The motor 18 operates the wiper 20 at a speed. For example, the speed can be in units of frequency, e.g., sweeps per minute. For another example, the speed can be an ordinal setting, e.g., a level in a ranked ordering. The ordinal setting can be selected from, e.g., in ascending order of speed, {off, intermittent, low, and high}. The motor setting {off} means that the motor 18 is not operating the wiper 20, i.e., the wiper 20 is stationary. The motor setting {intermittent} means that the motor 18 pauses between each sweep. The motor settings {low, high} mean that the motor 18 does not pause between sweeps, and the motor 18 moves the wipers 20 across the windshield 22 more quickly for the motor setting {high} than for the motor setting {low}. The set of ordinal settings can include more or fewer motor settings, e.g., more than one intermittent setting with pauses of different lengths, more than two speeds at which the motor 18 moves the wipers 20 move across the windshield 22, etc. The motor 18 can operate the wipers 20 at a speed from a range of values including at least three values, e.g., a range of continuous values from zero to 60 sweeps per minutes, {off, intermittent, low, and high}, etc. An example of how the speed of the windshield wipers 104 can be selected is described below with respect to FIG. 6.

With continued reference to FIG. 1, a sensor assembly 34 includes a housing 36 that is attachable to the vehicle 10, e.g., to one of the body panels 32 of the vehicle 10, e.g., the roof. The sensors 14 and the scanning sensor 38 are supported by and/or disposed in the housing 36. The housing 36 may be shaped to be attachable to the roof, e.g., may have a shape matching a contour of the roof. The housing 36 may be attached to the roof, which can provide the sensors 14 and the scanning sensor 38 with an unobstructed field of view of an area around the vehicle 10. The housing 36 may be formed of, e.g., plastic or metal.

Figure 2:
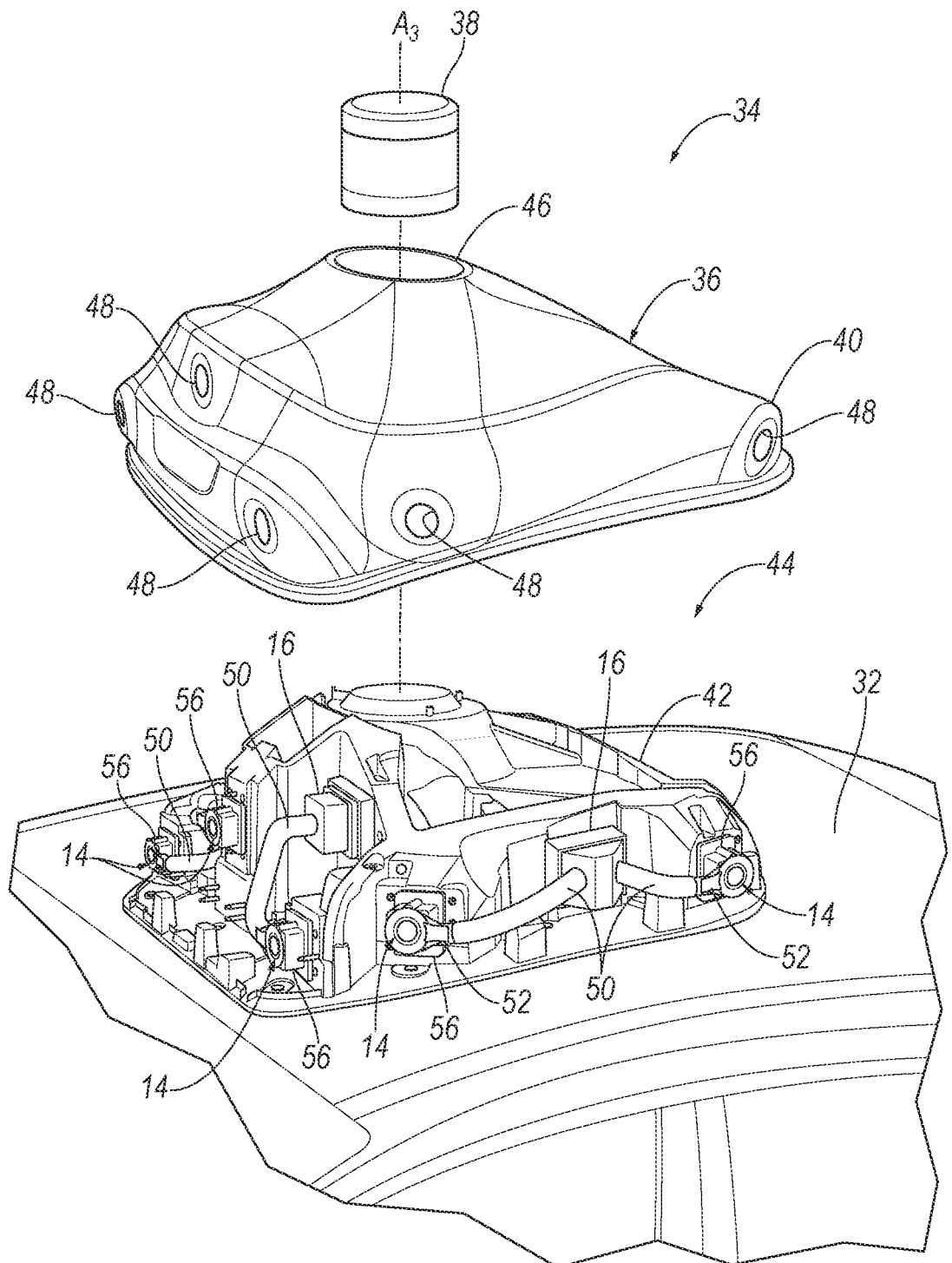
FIG. 2 is an exploded view of the sensor system.

With reference to FIG. 2, the housing 36 includes a housing upper piece 40 and a housing lower piece 42. The housing upper piece 40 and the housing lower piece 42 are shaped to fit together, with the housing upper piece 40 fitting on top of the housing lower piece 42. The housing upper piece 40 covers the housing lower piece 42. The housing 36 may enclose and define a chamber 44; for example, the housing upper piece 40 and the housing lower piece 42 may enclose and define the chamber 44. The housing 36 may shield contents of the chamber 44 from external elements such as wind, rain, debris, etc.

The housing upper piece 40 includes a central opening 46 that exposes the housing lower piece 42. The central opening 46 is round, e.g., has a circular or slightly elliptical shape. The housing upper piece 40 and the housing lower piece 42 are each monolithic. For the purposes of this disclosure, "monolithic" means a single-piece unit, i.e., a continuous piece of material without any fasteners, joints, welding, adhesives, etc., fixing multiple pieces to each other. For example, the housing upper piece 40 and the housing lower piece 42 may be stamped or molded as a single piece.

With continued reference to FIG. 2, the housing upper piece 40 may include apertures 48. The apertures 48 are holes in the housing upper piece 40 leading from the chamber 44 into the ambient environment. That is, the apertures 48 extend through the housing upper piece 40. The apertures 48 may be any suitable shape, e.g., circular. The housing upper piece 40 includes one aperture 48 for each sensor 14. Each sensor 14 has a field of view received through the respective aperture 48. For example, the sensors 14 may extend into the respective apertures 48. In such an example, the aperture 48 may be concentric about a portion of the sensor 14, e.g., a lens 54.

With continued reference to FIG. 2, the sensor assembly 34 includes the blower 16 positioned to direct air across the sensor 14. The blower 16 is supported by the housing lower piece 42. For example, the blower 16 may be mounted to the housing lower piece 42. For example, the blower 16 may include locating elements, fasteners, etc., that engage the housing lower piece 42. Additionally, or alternatively, fasteners may engage the blower 16 and the housing lower piece 42 to mount the blower 16 to the housing lower piece 42.

The blower 16 may include an electric motor, a fan, or other suitable structure for moving air. The blower 16 moves air towards the sensor 14, e.g., between an intake and an exhaust. The blower 16 may be configured to draw air via the intake and exhaust air via the exhaust towards the sensor 14. The intake of the blower 16 is in fluid communication with the chamber 44, and the exhaust of the blower 16 is in fluid communication with a duct 50. That is, the blower 16 pulls air from the chamber 44 and urges air to flow out of the exhaust, through a duct 50, to (and out of) an air nozzle 52 (discussed below), and across the lens 54 of the one sensor 14.

The blower 16 may be coupled to and in fluid communication with any suitable number of ducts 50, e.g., one or more. As one example, the blower 16 may be coupled to and in fluid communication with one duct 50. In such an example, the blower 16 may blow air into the duct 50, e.g., such that the blower 16 creates a positive pressure in the duct 50. As another example, the blower 16 may be coupled to and in fluid communication with two ducts 50. In such an example, the blower 16 may blow air into both ducts 50, e.g., such that the blower 16 creates a positive and equal pressure in the two ducts 50.

The sensor assembly 34 may include any suitable number of blowers 16. For example, the sensor assembly 34 may include one blower 16 for each sensor 14. In such an example, each blower 16 may blow air across one respective sensor 14. As another example, the sensor assembly 34 may include fewer blowers 16 than sensors 14, as shown in FIG. 2. In such an example, at least some of the blowers 16 may blow air across a respective plurality of sensors 14.

With continued reference to FIG. 2, the sensor assembly 34 may include a same number of ducts 50 as sensors 14. The sensors 14 may be spaced from each other within the chamber 44 such that each duct 50 extends toward one respective sensor 14. Each duct 50 extends from one blower 16 to one air nozzle 52. Specifically, each duct 50 is coupled to one blower 16 and one air nozzle 52. That is, each duct 50 is fluidly connected to one blower 16 such that air exhausted by the blower 16 enters the duct 50 and is fluidly connected to one air nozzle 52 such that air exhausted by the duct 50 enters the air nozzle 52. Said differently, each duct 50 receives air from one blower 16, e.g., the exhaust, and directs air to one respective air nozzle 52.

The ducts 50 are disposed in the chamber 44. The ducts 50 may be supported by the housing 36, as shown in FIG. 2. For example, the ducts 50 may be fixed to the housing lower piece 42, e.g., via fasteners, clips, adhesives, etc. The ducts 50 define respective flow paths from the corresponding blower 16 to the corresponding air nozzle 52. A cross-sectional area of each duct 50 normal to the flow path may, for example, be uniform from the corresponding blower 16 to the corresponding air nozzle 52, e.g., to maintain a speed of the air flowing through the respective duct 50. As another example, the cross-sectional area may vary between the corresponding blower 16 to the corresponding air nozzle 52, e.g., to change the speed of the air flowing through the respective duct 50.

With continued reference to FIG. 2, the sensor assembly 34 includes the sensors 14 and the scanning sensor 38. The sensors 14 may detect the location and/or orientation of the vehicle 10. For example, the sensors 14 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 14 may detect the external world, e.g., objects and/or characteristics of surroundings of the vehicle 10, such as other vehicles, road lane markings, traffic lights and/or signs, pedestrians, etc. For example, the sensors 14 may include radar sensors, scanning laser range finders, light detection and ranging (LIDAR) devices, and image processing sensors such as cameras. The sensors 14 may include communications devices, for example, vehicle-to-infrastructure (V2I) or vehicle-to-vehicle (V2V) devices.

The scanning sensor 38 may be disposed outside the housing 36. The scanning sensor 38 protrudes upward from the housing upper piece 40, as shown in FIGS. 1 and 2. The scanning sensor 38 may be a camera, a LIDAR device, a radar sensor, etc. The scanning sensor 38 is disposed above the housing lower piece 42 to have an unobstructed 360° horizontal field of view. For example, the scanning sensor 38 may be supported by the housing upper piece 40. In this situation, the scanning sensor 38 may extend at least partially through the housing upper piece 40 into the chamber 44, e.g., via the central opening 46. The scanning sensor 38 may be fixed relative to the housing upper piece 40 in the chamber 44, e.g., via fasteners, clips, etc. The scanning sensor 38 may be positioned laterally, i.e., along a left-right dimension relative to the vehicle 10, in a middle of the vehicle 10. The scanning sensor 38 may have a cylindrical shape defining an axis (not shown) that is oriented substantially vertically.

With continued reference to FIG. 2, the sensors 14 may be disposed in the housing 36, specifically in the chamber 44. The sensors 14 may be attached directly to the body panel 32 in the chamber 44, or the sensors 14 may be attached to the housing lower piece 42 in the chamber 44, which in turn is directly attached to the roof. The sensors 14 may be cameras arranged to collectively cover a 360° field of view with respect to a horizontal plane. Each sensor 14 has a field of view through the respective lens 54 and the respective aperture 48, and the field of view of one sensor 14 may overlap the fields of view of the sensors 14 that are circumferentially adjacent to one another, i.e., that are immediately next to each other.

Figure 3:
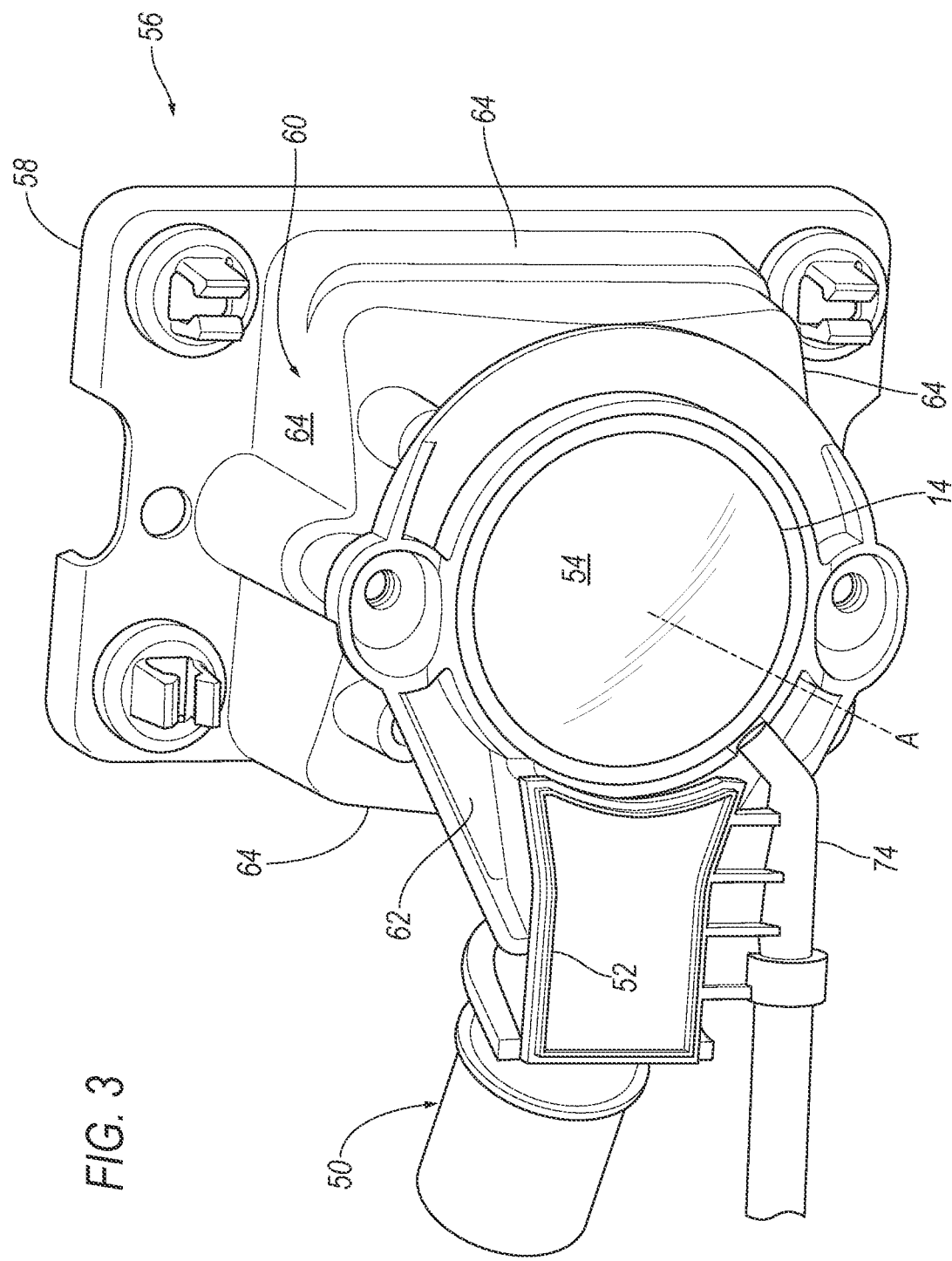
FIG. 3 is a perspective view of a portion of the sensor system with an air nozzle aimed at a lens of a sensor.

Turning now to FIG. 3, the sensors 14 include respective lenses 54. Each lens 54 may define the field of view of the respective sensor 14 through the aperture 48. Each lens 54 may be convex. Each lens 54 defines the axis A, around which the lens 54 is radially symmetric. The axis A extends along a center of the field of view of the respective sensor 14.

The sensor assembly 34 may include a plurality of casings 56. Each casing 56 may be disposed in the chamber 44 and mounted to one respective sensor 14. The casing 56 extends completely around the sensor 14. That is, the casing 56 shields the sensor 14 from the chamber 44.

With continued reference to FIG. 3, each casing 56 may include a base portion 58, a tunnel portion 60, and a top panel 62. The tunnel portion 60 extends circumferentially around the axis A. For example, the tunnel portion 60 can include a plurality of flat panels 64, e.g., four flat panels 64, connected together in a circumferential loop around the axis A. The top panel 62 extends parallel to the lens 54, i.e., orthogonal to the axis A defined by the lens 54. The base portion 58 extends radially outward from the tunnel portion 60 relative to the axis A, and the top panel 62 extends radially inward from the tunnel relative to the axis A. The top panel 62 and the base portion 58 can be parallel to each other.

Figure 5A:
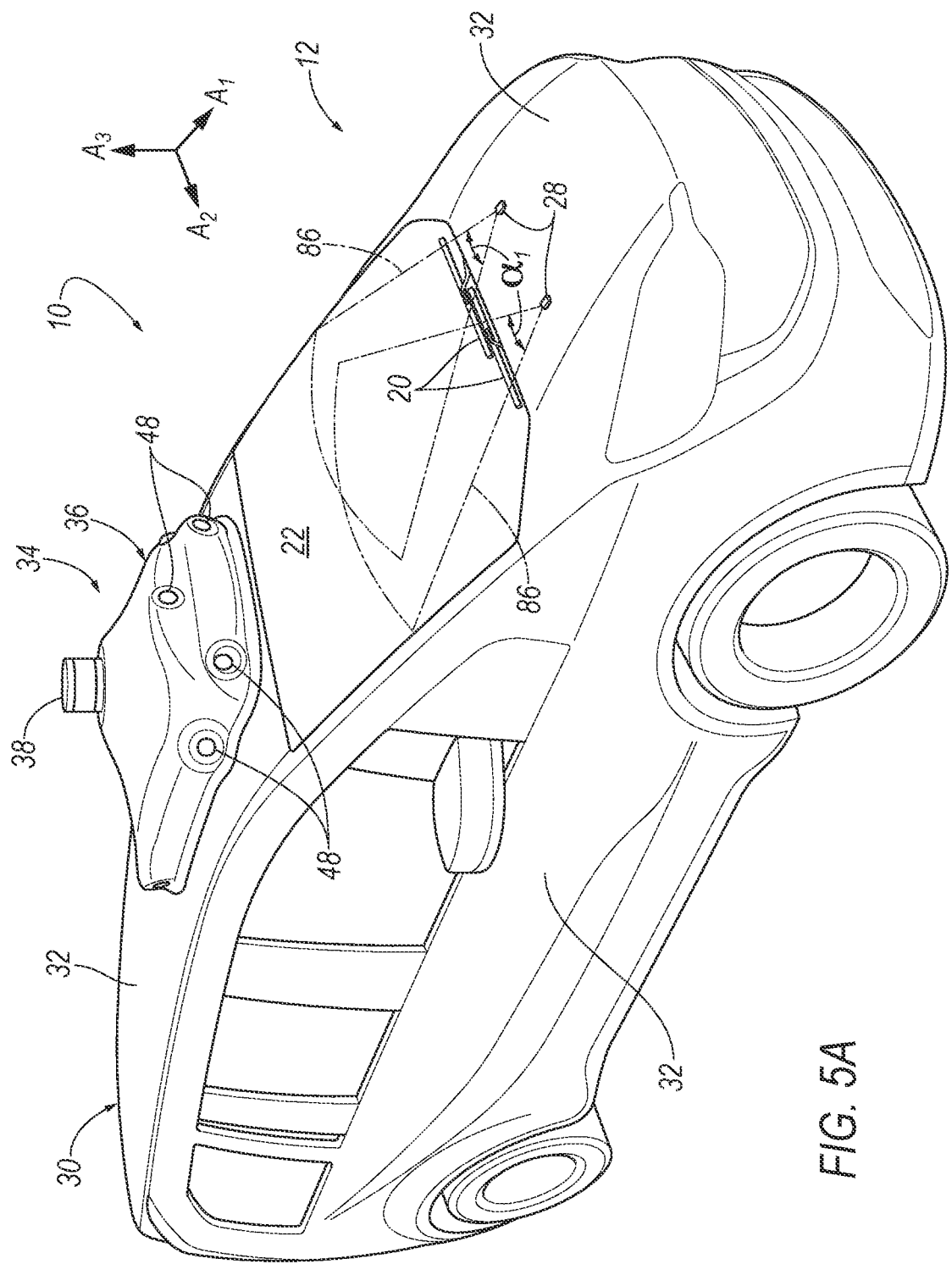
FIGS. 5A-5B are perspective views of the vehicle including windshield fluid nozzles having exemplary spray patterns.
Figure 5B:
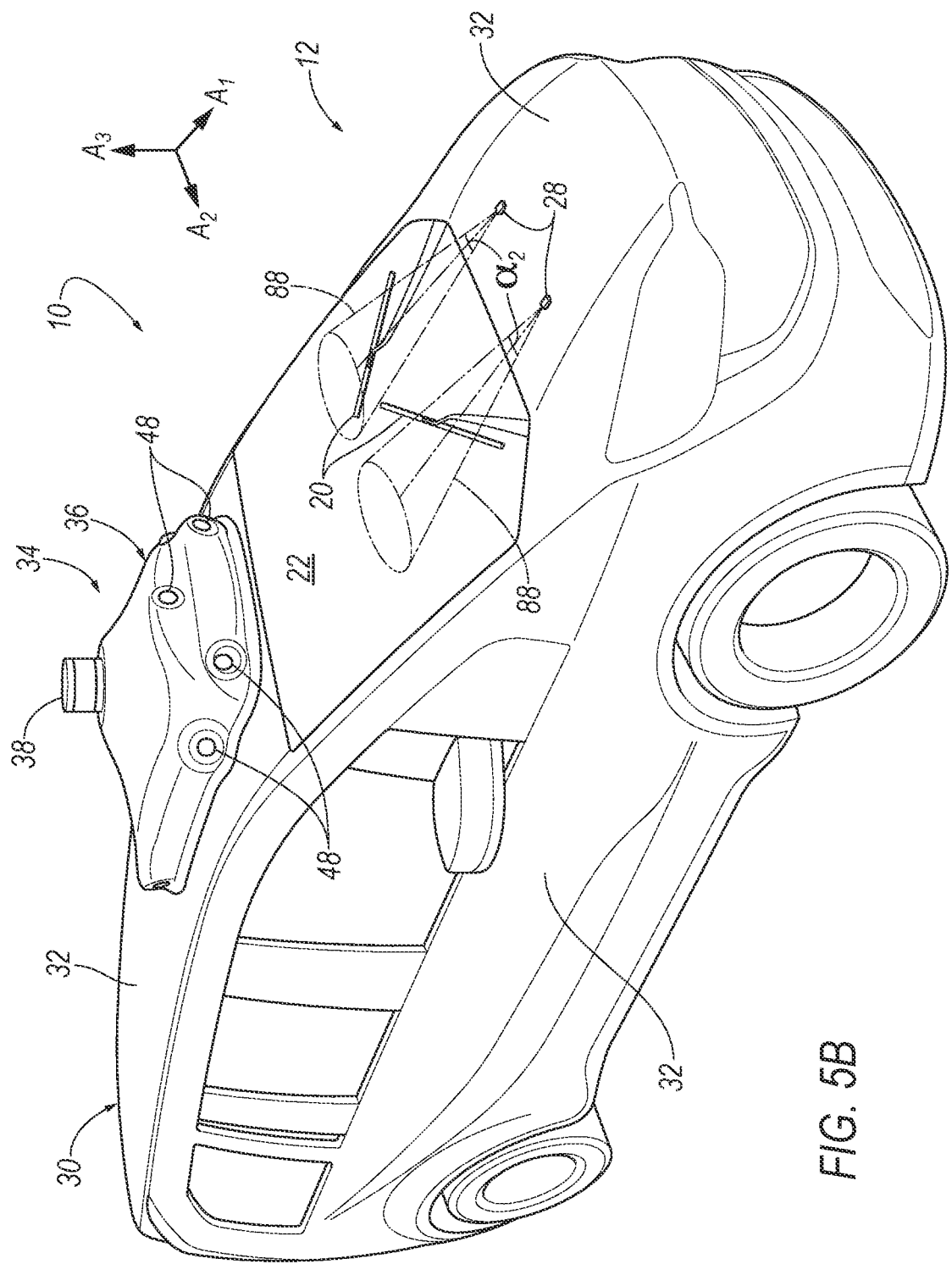

The casing 56 is attached to the sensor 14. Specifically, the base portion 58 of the casing 56 is attached to the sensor 14, and the rest of the casing 56 is not attached to the sensor 14, as shown in FIGS. 5A-5C. The base portion 58 is attached to the sensor 14 in any suitable manner, e.g., clips, fasteners, adhesive, etc. The tunnel portion 60 and the top panel 62 hang from the base portion 58 and extend around the lens 54 without being attached directly to the sensor 14 or the lens 54. This arrangement reduces vibrations experienced by the sensor 14.

With continued reference to FIG. 3, the air nozzle 52 may be mounted to the casing 56, specifically to the top panel 62. For example, the top panel 62 may include an overhanging portion extending radially outside the tunnel portion 60 relative to the axis A. The air nozzle 52 may be attached to the overhanging portion in any suitable manner, e.g., clips, fasteners, adhesive, etc.

The air nozzle 52 is aimed across and at the lens 54 so that air strikes the lens 54 at a shallow angle, e.g., less than 10°. The air nozzle 52 may be shaped to discharge air in a flat-fan pattern (not shown). For the purposes of this disclosure, a "flat-fan pattern" means that the discharge has an increasing width in one dimension as the discharge moves away from the air nozzle 52 and has a generally flat shape along a plane defined by the width and a direction of discharge. The direction of discharge is directed along a center of the spray pattern, i.e., bisecting the flat-fan pattern. The direction of discharge of the air nozzle 52 is in a radially inward direction with respect to the axis A, i.e., a direction that is toward the axis A.

The spray pattern may cause the airflow from the air nozzle 52 to form an air curtain across the lens 54. For the purposes of this disclosure, an "air curtain" means a layer of moving air that has a width significantly greater than a thickness, that is close to a surface, and that is moving generally parallel to the surface. An air curtain can, for example, remove debris from the lens 54 as well as prevent debris from contacting the lens 54. As another example, the air curtain can dry, defog, and/or defrost the lens 54.

Figure 4:
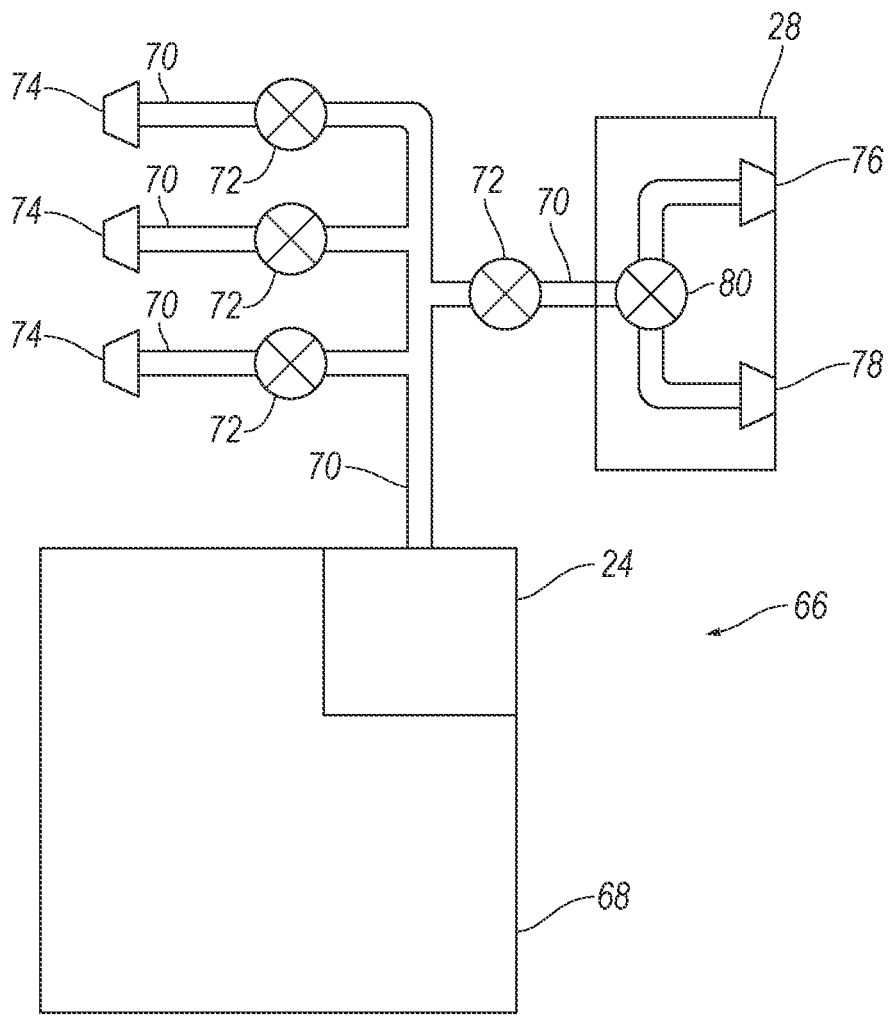
FIG. 4 is a diagram of an example cleaning system of the vehicle.

Turning now to FIG. 4, the vehicle 10 may include a liquid cleaning system 66. The liquid cleaning system 66 may include a reservoir 68, the pump 24, supply lines 70, valves 72, the windshield fluid nozzles 28 and sensor fluid nozzles 74. The reservoir 68 and the pump 24 are fluidly connected (i.e., fluid can flow from one to the other) to each valve 72 and to each the fluid nozzle 28, 74. The liquid cleaning system 66 distributes washer fluid stored in the reservoir 68 to the fluid nozzles 28, 74. "Washer fluid" refers to any liquid stored in the reservoir 68 for cleaning. The washer fluid may include solvents, detergents, diluents such as water, etc.

The reservoir 68 may be a tank fillable with liquid, e.g., washer fluid for window cleaning. The reservoir 68 may be disposed in a front of the vehicle 10, specifically, in an engine compartment forward of a passenger cabin. The reservoir 68 may store the washer fluid only for supplying the sensor assembly 34 or also for other purposes, such as supply to the windshield.

The pump 24 forces the washer fluid through the supply lines 70 to the valves 72 and then to the fluid nozzles 28, 74 with sufficient pressure that the washer fluid sprays from the fluid nozzles 28, 74. The pump 24 is fluidly connected to the reservoir 68. The pump 24 may, for example, be attached to or disposed in the reservoir 68. For example, the pump 24 may be disposed in the front of the vehicle 10, specifically, in an engine compartment forward of a passenger cabin (see FIG. 1).

The supply lines 70 can extend from the pump 24 to the valves 72, and from the valves 72 to the fluid nozzles 28, 74. A separate supply line 70 extends from each valve 72 to the respective fluid nozzle 28, 74. The supply lines 70 may be, e.g., flexible tubes.

The valves 72 are independently actuatable to open and close, to permit the washer fluid to flow through or to block the washer fluid; i.e., each valve 72 can be opened or closed without changing the status of the other valves 72. Each valve 72 is positioned to permit or block flow from the reservoir 68 to a respective one of the fluid nozzles 28, 74. The valves 72 may be any suitable type of valve, e.g., ball valve, butterfly valve, choke valve, gate valve, globe valve, etc.

With continued reference to FIG. 4, the windshield fluid nozzles 28 may maintain clarity of a field-of-view of the windshield 22, e.g., liquid exiting the windshield fluid nozzles 28 may clean the windshield 22. Each windshield fluid nozzle 28 may be mounted to a body panel 32, e.g., the hood of the vehicle 10 (see FIGS. 1 and 5A-5B). The windshield fluid nozzles 28 may be attached to the hood in any suitable manner, e.g., clips, fasteners, adhesive, etc. The windshield fluid nozzles 28 are aimed across the windshield 22.

Each windshield fluid nozzle 28 may define a nozzle axis (not shown) extending parallel to the axis $A_3$. Each windshield fluid nozzle 28 may include a first opening 76 and a second opening 78. The first opening 76 and the second opening 78 may be spaced from each other along the axis $A_3$, i.e., vertically relative to the vehicle 10. For example, the second opening 78 may be disposed between the body panel 32, e.g., the hood, and the first opening 76. The first opening 76 and the second opening 78 may be aligned with each other relative to the axis $A_1$, i.e., spaced a same distance from the windshield 22. The first and second openings 76, 78 are each configured to discharge fluid across the windshield 22. The first and second openings 76, 78 may be aligned circumferentially relative to the nozzle axis. That is, the first and second openings 76, 78 may be aimed in a same direction relative to the windshield 22.

The first opening 76 may be shaped to spray the fluid in a flat-fan pattern 86 (see FIG. 5A). The second opening 78 may be shaped to spray the fluid in a jet pattern 88 (see FIG. 5B). For the purposes of this disclosure, a "jet pattern" means that the discharge has an increasing width in one dimension as the discharge moves away from the second opening 78 and has a generally round shape about a direction of discharge.

The flat-fan pattern 86 has a first spray angle $\alpha_1$, i.e., an angular width of the spray measured circumferentially around the nozzle axis (see FIG. 5A). The jet pattern has a second spray angle as (see FIG. 5B). The second spray angle as is different than the first spray angle $\alpha_1$. The second spray angle $\alpha_2$ may be less than the first spray angle $\alpha_1$, which can discharge the fluid in droplets having diameters that are generally greater than diameters of droplets discharged with the first spray angle $\alpha_1$. Discharging the fluid in the jet pattern can increase a size and weight of fluid droplets discharged from the windshield fluid nozzle 28, which reduces a likelihood of the droplets reaching the sensor 14.

The first and second openings 76, 78 each have a direction of discharge directed along a center of the spray pattern, i.e., bisecting the spray angle $\alpha_1$, $\alpha_2$. The directions of discharge of the first and second openings 76, 78 are in a direction towards the windshield 22. That is, the first and second openings 76, 78 are aimed to direct the fluid across the windshield 22. The direction of discharge of the first opening 76 may be a same or different angle as the direction of discharge of the second opening 78. For example, the direction of discharge of the second opening 78 may be at a steeper angle than the direction of discharge of the first opening 76. Having a steeper angle for the direction of discharge of the second opening 78 directs the fluid discharged from the second opening 78 to a position that is closer to the hood than to the roof, which reduces a likelihood of the fluid reaching the sensor 14.

Figure 6:
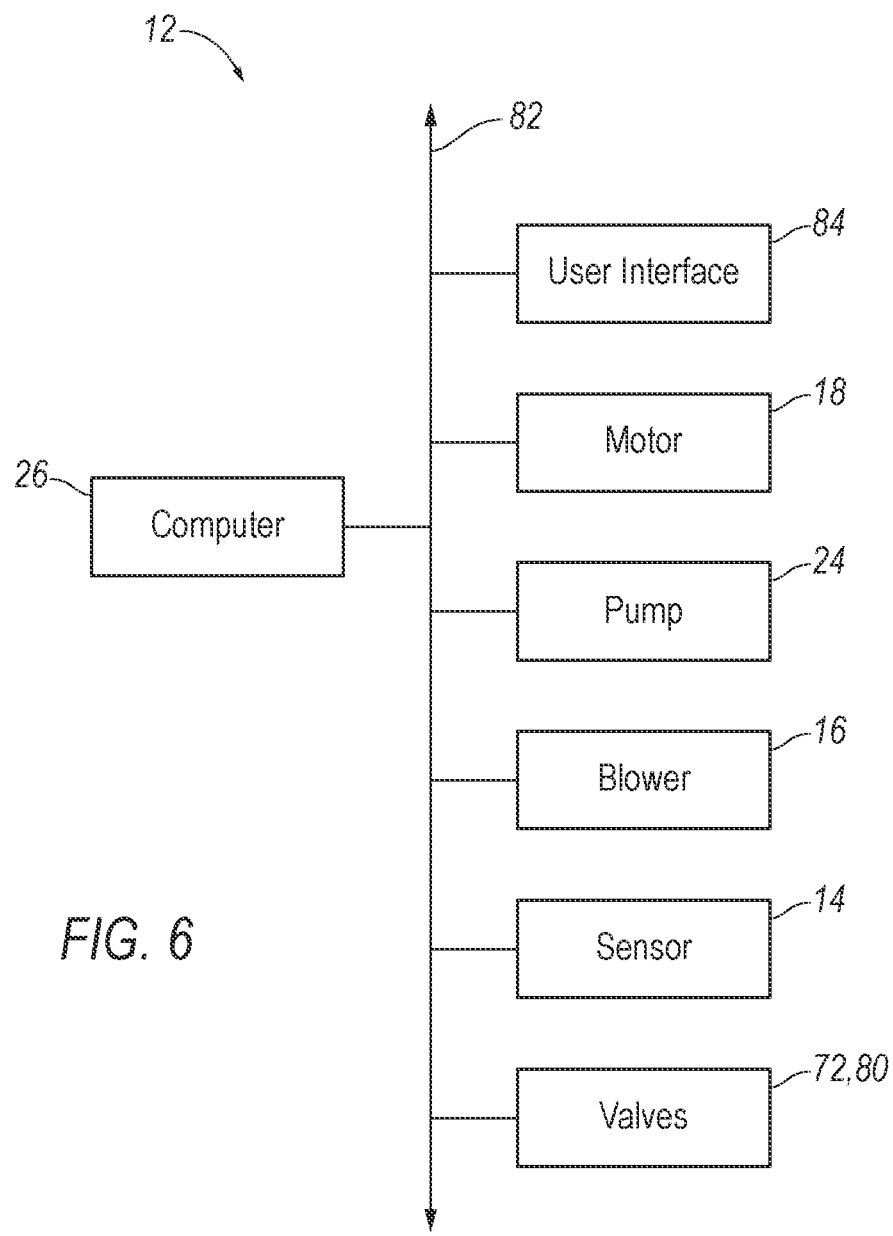
FIG. 6 is a block diagram of a control system for the sensor system.

With continued reference to FIG. 6, the windshield fluid nozzle 28 may include a stopper valve 80 positioned to permit or block flow from the reservoir 68 to a respective one of the openings 76, 78. That is, the first opening 76 and the second opening 78 are separately in fluid communication with the reservoir 68. The stopper valve 80 is movable between a first position in which the stopper valve 80 permits fluid through the first opening 76, i.e., blocks fluid from flowing through the second opening 78, and a second position in which the stopper valve 80 permits fluid through the second opening 78, i.e., blocks fluid from flowing through the first opening 76. The stopper valve 80 may include an actuator (not shown), e.g., an electric motor or some other suitable structure, configured to move the between the first position and the second position. The stopper valve 80 may be any suitable type of valve, e.g., ball valve, butterfly valve, choke valve, gate valve, globe valve, etc.

Returning to FIG. 3, the sensor fluid nozzles 74 may maintain clarity of a field-of-view of a respective sensor 14, e.g., liquid exiting the sensor fluid nozzles 74 may clean the lenses 54 of the sensors 14. Each sensor fluid nozzle 74 may be mounted to one respective casing 56, specifically to the top panel 62, e.g., the overhanging portion. The sensor fluid nozzle 74 may be attached to the overhanging portion, e.g., in substantially the same manner as the air nozzle 52.

The sensor fluid nozzle 74 may be aimed across and at the lens 54 so that fluid strikes the lens 54 at a shallow angle, e.g., less than 10°. That is, the sensor fluid nozzle 74 is aimed to direct fluid across the lens 54. The sensor fluid nozzle 74 may be shaped to spray fluid in the flat-fan pattern (not shown). The sensor fluid nozzle 74 has a direction of discharge (not shown) directed along a center of the spray pattern, i.e., bisecting the flat-fan pattern. The direction of discharge of the sensor fluid nozzle 74 is in a radially inward direction with respect to the axis A, i.e., a direction that is toward the axis A.

The direction of discharge of the sensor fluid nozzle 74 is different than, i.e., transverse to, the direction of airflow of the air nozzle 52. For example, the sensor fluid nozzle 74 may be circumferentially spaced from the air nozzle 52 about the axis A. As one example, the sensor fluid nozzle 74 may be oblique to the air nozzle 52. This arrangement may assist in positioning the sensor fluid nozzle 74 such that the sensor fluid nozzle 74 does not interfere with the airflow from the air nozzle 52 and that sprayed fluid can contact the lens 54 at the desired shallow angle.

With reference to FIG. 6, the computer 26 is a microprocessor-based computing device, e.g., a generic computing device including a processor and a memory, an electronic controller or the like, a field-programmable gate array (FPGA), an application-specific integrated circuit (ASIC), etc. The computer 26 can thus include a processor, a memory, etc. The memory of the computer 26 can include media for storing instructions executable by the processor as well as for electronically storing data and/or databases, and/or the computer 26 can include structures such as the foregoing by which programming is provided. The computer 26 can be multiple computers coupled together.

The computer 26 may transmit and receive data through a communications network 82 such as a controller area network (CAN) bus, Ethernet, WiFi, Local Interconnect Network (LIN), onboard diagnostics connector (OBD-II), and/or by any other wired or wireless communications network. The computer 26 is communicatively coupled to the sensor 14, the blower 16, the motor 18, and the pump 24, the stopper valve 80, e.g., the actuator, and other components via the communications network 82.

The user interface 84 presents information to and receives information from the operator of the vehicle 10. The user interface 84 may be located, e.g., on an instrument panel in a passenger cabin of the vehicle 10, or wherever may be readily seen by the operator. The user interface 84 may include dials, digital readouts, screens, speakers, and so on for providing information to the operator, e.g., human-machine interface (HMI) elements such as are known. The user interface 84 may include buttons, knobs, keypads, microphone, and so on for receiving information from the operator.

The computer 26 can be programmed to transition an autonomous mode of a vehicle 10 from a deactivated state to an activated state. In the deactivated state, the computer 26 can monitor vehicle operation. In the activated state, the computer 26 can control vehicle operation. The computer 26 can transition the autonomous mode between the activated state and the deactivated state based on a first user input. For example, when the autonomous mode is deactivated, the computer 26 can detect the first user input selecting the autonomous mode. For example, the computer 26 can actuate sensors that can detect the user pressing a button, e.g., an actual button or a virtual button, toggling a switch, turning a dial, etc., selecting to activate the autonomous mode. Upon detecting the first user input, the user interface 84 can then provide the first user input to the computer 26, and the computer 26 can activate the autonomous mode based on the first user input. Similarly, when the autonomous mode is activated, the computer 26 can detect a second user input deactivating the autonomous mode, e.g., in substantially the same manner as just discussed.

The computer 26 can be programmed to determine to clean the windshield 22 based on a third user input. For example, the computer 26 can receive a request from the user, e.g., via the user interface 84. For example, the user can pull a lever, push a button, turn a dial, etc. of the user interface 84 indicating a request to clean the windshield 22. The computer 26 can then actuate the motor 18 in the low setting in response to determining to clean the windshield 22, i.e., receiving the request.

Upon determining to clean the windshield 22, the computer 26 can actuate the blower 16 based on whether the autonomous mode is activated or deactivated. When the autonomous mode is deactivated, the computer 26 can prevent actuation of the blower 16 in response to determining to clean the windshield 22. Additionally, when the autonomous mode is deactivated, the computer 26 can actuate the blower 16 based on detecting debris and/or liquid droplets on the sensor 14. The computer 26 can detect debris and/or liquid droplets on the sensor 14 based on data from the sensor 14. For example, the computer 26 may determine, e.g., according to known image-analysis techniques, that a set of pixels in image data received from the respective sensor 14 is distorted, e.g., blurred, compared to the other of the pixels in the image data, suggesting that a fluid is on a portion of the sensor 14. As another example, the computer 26 may determine, e.g., according to known image-analysis techniques, that a set of pixels in image data received from the respective sensor 14 is obscured compared to the other of the pixels in the image data, suggesting that debris is on a portion of the sensor 14. Other algorithms may be used, e.g., classical computer vision or machine learning algorithms such as convolutional neural networks. Upon detecting debris and/or liquid droplets on the sensor 14, the computer 26 can actuate the blower 16, e.g., based on determining to transition the autonomous mode from the deactivated state to the activated state. When the autonomous mode is activated, the computer 26 can actuate the blower 16 to direct air across the sensor 14 upon determining to clean the windshield 22, i.e., detecting the third user input. In this situation, the computer 26 can, for example, actuate the blower 16 at a maximum speed for the blower 16.

Upon determining to clean the windshield 22, the computer 26 can actuate the pump 24 based on whether the autonomous mode is activated or deactivated. When the autonomous mode is deactivated, the computer 26 can actuate the pump 24 upon detecting the third user input. In this situation, the computer 26 can actuate the pump 24 prior to actuating the motor 18. Additionally, when the autonomous mode is deactivated, the computer 26 can actuate the pump 24 to direct fluid through the windshield fluid nozzles 28, and specifically the first openings 76, according to a maximum pressure for the pump 24.

When the autonomous mode is activated, the computer 26 can actuate the pump 24 upon expiration of a first timer. The computer 26 can initiate the first timer upon actuating the blower 16. A duration of the first timer can be determined empirically, e.g., based on testing that allows for determining a minimum amount of time for the computer 26 to actuate the blower 16 and the motor 18. That is, when the autonomous mode is activated, the computer 26 actuates the pump 24 after actuating the blower 16 and the motor 18 in response to detecting the third user input. The duration of the first timer can be stored, e.g., in a memory of the computer 26.

Additionally, when the autonomous mode is activated, the computer 26 can actuate the pump 24 to direct fluid through the windshield fluid nozzles 28, and specifically the second openings 78, according to pressure threshold. As explained above, the pressure threshold specifies a fluid pressure that is less than the maximum pressure for the pump 24. The pressure threshold can be stored, e.g., in a memory of the computer 26. The pressure threshold can be determined empirically, e.g., based on testing that allows for determining a minimum pressure that is sufficient to discharge fluid through the windshield fluid nozzles 28 to clean the windshield 22.

The computer 26 can determine to stop the pump 24 based on whether the autonomous mode is activated or deactivated. When the autonomous mode is deactivated, the computer 26 can stop the pump 24 based on detecting an absence of the third user input. In other words, when the autonomous mode is deactivated, the computer 26 can maintain actuation the pump 24 while detecting the third user input. The computer 26 can stop the motor 18 after stopping the pump 24 when the autonomous mode is deactivated.

When the autonomous mode is activated, the computer 26 can stop the pump 24 upon expiration of a second timer. That is, when the autonomous mode is activated, the computer 26 stops the pump 24 after the second timer expires regardless of whether the computer 26 detects the absence of the third user input. The computer 26 can initiate the second timer upon actuating the pump 24. A duration of the second timer can be determined empirically, e.g., based on testing that allows for determining a minimum amount of time in which fluid can be discharged to clean the windshield 22. The duration of the second timer can be stored, e.g., in a memory of the computer 26. The computer 26 can stop the motor 18 after stopping the pump 24 when the autonomous mode is activated. The computer 26 can, for example, stop the blower 16 after stopping the motor 18 when the autonomous mode is activated. As another example, the computer 26 can stop the blower 16 and the motor 18 substantially simultaneously when the autonomous mode is activated.

The computer 26 can actuate the stopper valve 80 to move between the first position and the second position based on whether the autonomous mode is activated or deactivated. For example, when the autonomous mode is deactivated, the computer 26 can actuate the stopper valve 80 to move to the first position or can prevent actuation of the stopper valve 80 to move to the second position (i.e., can maintain the stopper valve 80 in the first position). As another example, when the autonomous mode is activated, the computer 26 can actuate the stopper valve 80 to move to the second position or can prevent actuation of the stopper valve 80 to move to the first position (i.e., can maintain the stopper valve 80 in the second position).

Figure 7:
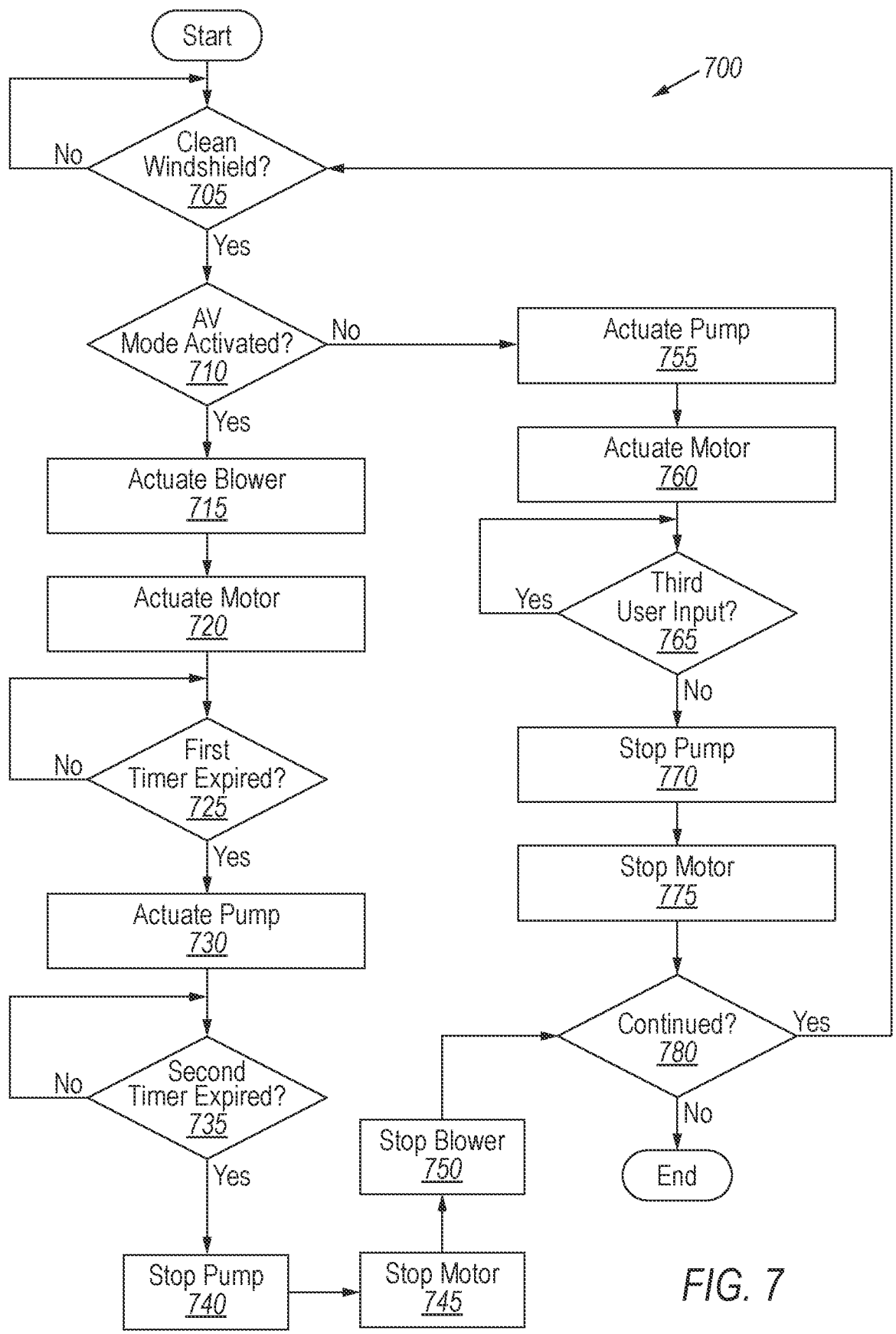
FIG. 7 is a flowchart of an example process for cleaning a windshield.

FIG. 7 is a flow chart illustrating an exemplary process 700 executed in a computer 26 according to program instructions stored in a memory thereof to clean a windshield 22 based on an activation state of an autonomous mode for a vehicle 10. Process 700 includes multiple blocks that can be executed in the illustrated order. Process 700 could alternatively or additionally include fewer blocks or can include the blocks executed in different orders.

The process 700 beings in a block 705. In the block 705, the computer 26 determines whether to clean the windshield 22. The computer 26 can determine to clean the windshield 22 based on detecting a third user input, e.g., via a user interface 84, as discussed above. The computer 26 can determine not to clean the windshield 22 based on detecting an absence of the third user input. If the computer 26 determines to clean the windshield 22, then the process 700 continues in a block 710. Otherwise, the process 700 remains in the block 705.

In the block 710, the computer 26 determines whether the autonomous mode is activated. The computer 26 can transition the autonomous mode from a deactivated state to an activated state based on detecting a first user input, as discussed above. That is, the computer 26 can determine that the autonomous mode is activated based on detecting the first user input. The computer 26 can transition the autonomous mode from the activated state to the deactivated state based on detecting a second user input, as discussed above. That is, the computer 26 can determine that the autonomous mode is deactivated based on detecting the second user input. If the computer 26 determines that the autonomous mode is activated, then the process 700 continues in a block 715. Otherwise, the process 700 continues in a block 755.

In the block 715, the computer 26 actuates a blower 16 to direct air across a lens 54 of a sensor 14. Upon actuating the blower 16, the computer 26 initiates a first timer. The process 700 continues in a block 720.

In the block 720, the computer 26 actuates a motor 18 in a low setting. The motor 18 moves a wiper 20 across the windshield 22 to clear the windshield 22, e.g., of debris and/or liquid droplets. The process 700 continues in a block 725.

In the block 725, the computer 26 determines whether the first timer has expired. If the first timer has not expired, then the process 700 remains in the block 725. Otherwise, the process 700 continues to a block 730.

In the block 730, the computer 26 actuates a pump 24 to direct fluid through windshield fluid nozzles 28. The computer 26 actuates the pump 24 according to a pressure threshold, as discussed above. Upon actuating the pump 24, the computer 26 initiates a second timer. Additionally, the computer 26 can control stopper valves 80 in the windshield fluid nozzles 28 to permit fluid to flow through respective second openings 78 in the windshield fluid nozzles 28. The process 700 continues in a block 735.

In the block 735, the computer 26 determines whether the second timer has expired. If the second timer has not expired, then the process 700 remains in the block 735. Otherwise, the process 700 continues to a block 740.

In the block 740, the computer 26 stops the pump 24. The process 700 continues in a block 745.

In the block 745, the computer 26 stops the motor 18. For example, upon stopping the pump 24, the computer 26 can stop the motor 18 after moving the wiper 20 across the windshield 22 to wipe, i.e., clear, the windshield 22. The process 700 continues in a block 750.

In the block 750, the computer 26 stops the blower 16. The computer 26 can stop the blower 16 after a predetermined time. The predetermined time can be determined empirically, e.g., based on testing that allows for determining an amount of time after stopping the pump 24 within which fluid may continue to discharge towards the sensor 14. As another example, the computer 26 can stop the blower 16 based on detecting an absence of liquid droplets on the sensor 14 via data from the sensor 14, as discussed above. The process 700 continues in a block 780.

In the block 755, the computer 26 actuates the pump 24 to direct fluid through the windshield fluid nozzles 28. Specifically, the computer 26 actuates the pump 24 according to a maximum pressure for the pump 24. Additionally, the computer 26 can control the stopper valves 80 in the windshield fluid nozzles 28 to permit fluid to flow through respective first openings 76 in the windshield fluid nozzles 28. The process 700 continues in a block 760.

In the block 760, the computer 26 actuates a motor 18 in a low setting. The block 760 is substantially the same the block 720 of process 700 and therefore will not be described further to avoid redundancy. The process 700 continues in a block 765.

In the block 765, the computer 26 determines whether the third user input continues. If the computer 26 detects the third user input, then the process 700 remains in the block 765. If the computer 26 detects an absence of the third user input, then the process 700 continues in a block 770.

In the block 770, the computer 26 stops the pump 24. The process 700 continues in a block 775.

In the block 775, the computer 26 stops the motor 18. For example, upon stopping the pump 24, the computer 26 can stop the motor 18 after moving the wiper 20 across the windshield 22 to wipe, i.e., clear, the windshield 22. The process 700 continues in a block 780.

In the block 780, the computer 26 determines whether to continue the process 700. For example, the computer 26 can determine to continue upon determining that the vehicle 10 is powered on. In another example, the computer 26 can determine not to continue when the vehicle 10 is powered off. If the computer 26 determines to continue, the process 700 returns to the block 705. Otherwise, the process 700 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A vehicle system, comprising:
a sensor;
a blower configured to direct air across the sensor;
a motor configured to move a wiper across a windshield;
a pump configured to direct fluid across the windshield and towards the sensor; and
a computer communicatively coupled to the sensor, the blower, the motor, and the pump, wherein the computer is programmed to:
upon determining to clean the windshield, actuate the motor in a first setting;
actuate the blower based on determining an autonomous mode of the vehicle is activated;
then, after expiration of a first timer, actuate the pump according to a pressure threshold that specifies a fluid pressure less than a maximum fluid pressure of the pump;
stop the pump after expiration of a second timer;
stop the blower after stopping the pump.

2. The system of claim 1, wherein the computer is further programmed to determine to clean the windshield based on a user input.

3. The system of claim 1, wherein the computer is further programmed to stop the blower after stopping the motor.

4. The system of claim 1, further comprising a fluid nozzle in fluid communication with the pump and aimed to discharge fluid across the windshield, wherein the computer is communicatively coupled to the fluid nozzle and is further programmed to, upon determining the autonomous mode is activated, actuate the fluid nozzle to discharge fluid in a jet pattern.

5. The system of claim 4, wherein the computer is further programmed to, upon determining the autonomous mode is deactivated, actuate the fluid nozzle to discharge fluid in a flat-fan pattern.

6. The system of claim 5, wherein the computer is further programmed to transition the autonomous mode between a deactivated state and an activated state based on a user input.

7. The system of claim 4, further comprising an air nozzle aimed to discharge air across the sensor and a duct coupled to the blower and the air nozzle.

8. The system of claim 1, wherein the computer is further programmed to initiate the first timer upon actuating the blower.

9. The system of claim 1, wherein the computer is further programmed to initiate the second timer upon actuating the pump.

10. The system of claim 1, further comprising a body supporting the windshield and a housing mounted to the body and spaced from the windshield, wherein the sensor and the blower are disposed in the housing and the pump and the motor are disposed outside the housing.

11. A computer comprising a processor and a memory, the memory storing instructions executable by the processor such that the computer is programmed to:
   upon determining to clean a windshield for a vehicle, actuate a motor to move a wiper across the windshield in a first setting;
   actuate a blower to direct air across a sensor based on determining an autonomous mode of the vehicle is activated;
   then, after expiration of a first timer, actuate a pump according to a pressure threshold to direct fluid through a fluid nozzle and across the windshield towards the sensor, wherein the pressure threshold specifies a fluid pressure less than a maximum fluid pressure of the pump;
   stop the pump after expiration of a second timer; and
   stop the blower after stopping the pump.

12. The computer of claim 11, wherein the computer is further programmed to determine clean the windshield based on a user input.

13. The computer of claim 11, wherein the computer is further programmed to stop the blower after stopping the motor.

14. The computer of claim 11, wherein the computer is further programmed to, upon determining the autonomous mode is activated, actuate the fluid nozzle to discharge fluid in a jet pattern.

15. The computer of claim 11, wherein the computer is further programmed to, upon determining the autonomous mode is deactivated, actuate the fluid nozzle to discharge fluid in a flat-fan pattern.

16. The computer of claim 15, wherein the computer is further programmed to transition the autonomous mode between a deactivated state and an activated state based on a user input.

17. The computer of claim 11, wherein the computer is further programmed to initiate the first timer upon actuating the blower and the second timer upon actuating the pump.

18. A method, comprising:
   upon determining to clean a windshield for a vehicle, actuating a motor to move a wiper across the windshield in a first setting;
   actuating a blower to direct air across a sensor based on determining an autonomous mode of the vehicle is activated;
   then, after expiration of a first timer, actuating a pump according to a pressure threshold to direct fluid through a fluid nozzle and across the windshield towards the sensor, wherein the pressure threshold specifies a fluid pressure less than a maximum fluid pressure of the pump;
   stopping the pump after expiration of a second timer; and
   stopping the blower after stopping the pump.

19. The method of claim 18, further comprising stopping the blower after stopping the motor.

\* \* \* \* \*